(12) United States Patent
Oden et al.

(10) Patent No.: US 12,158,574 B2
(45) Date of Patent: Dec. 3, 2024

(54) MICROELECTROMECHANICAL SYSTEMS CONTACT AREA REDUCTION

(71) Applicant: TEXAS INSTRUMENTS INCORPORATED, Dallas, TX (US)

(72) Inventors: Patrick Ian Oden, McKinney, TX (US); James Norman Hall, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 412 days.

(21) Appl. No.: 17/472,947

(22) Filed: Sep. 13, 2021

(65) Prior Publication Data

US 2023/0078156 A1 Mar. 16, 2023

(51) Int. Cl.
*G02B 26/08* (2006.01)
*G02B 6/35* (2006.01)

(52) U.S. Cl.
CPC ....... *G02B 26/0833* (2013.01); *G02B 6/3518* (2013.01)

(58) Field of Classification Search
CPC .............. G02B 26/0833; G02B 6/3518
USPC ......... 359/198.1, 199.2, 212.1, 212.2, 213.1, 359/214.1, 223.1, 225.1, 290, 295, 298
See application file for complete search history.

(56) References Cited

U.S. PATENT DOCUMENTS 10,598,980 B2    3/2020   Chen
2002/0186449 A1*  12/2002  Anderson .......... G02B 26/0841
                                                  359/291

* cited by examiner

*Primary Examiner* — William Choi
(74) *Attorney, Agent, or Firm* — Michelle F. Murray; Frank D. Cimino

(57) ABSTRACT

In an example, a system includes a digital micromirror device (DMD). The DMD includes a hinge and one or more spring tips coupled to the hinge, where the hinge is configured to tilt toward a raised address electrode. The DMD includes a micromirror including a recessed mirror shelf and a reflective surface, where the recessed mirror shelf is coupled to the hinge, and where the recessed mirror shelf is configured to contact at least one of the one or more spring tips responsive to the hinge tilting toward the raised address electrode.

20 Claims, 10 Drawing Sheets

MICROELECTROMECHANICAL SYSTEMS CONTACT AREA REDUCTION

BACKGROUND

Microelectromechanical systems (MEMS) are microscopic devices that combine mechanical and electrical systems. MEMS include inertial based sensors, such as accelerometers and gyroscopes, which sense acceleration, motion, or rotational movement. MEMS devices may also be used as pressure sensors, where the deflection of a membrane of a pressurized cavity may be measured capacitively to determine pressure. MEMS are useful as actuators, which convert electrical energy to mechanical motion. MEMS actuators are used in a variety of optical and industrial applications. These applications include variable capacitors (varactors), micro-relays, optical displays, and focusing mechanisms for cameras in mobile devices. An example of a MEMS actuator is the cantilever that moves the individual mirrors in a digital micromirror device (DMD).

SUMMARY

In accordance with at least one example of the description, a system includes a first edge of a first surface of a MEMS device, where the first edge is an etched edge. The system also includes a second surface and second edge of a MEMS device, where the second edge is an etched edge, where the first edge is configured to move and contact the second edge, and where the first surface is non-parallel to the second surface.

In accordance with at least one example of the description, a method includes depositing a first metal layer for a hinge and one or more spring tips on a first spacer material. The method also includes depositing a second spacer material on the first metal layer. The method includes patterning a mirror via in the second spacer material. The method also includes depositing a second metal layer for a recessed mirror shelf on the second spacer material. The method includes patterning the second metal layer to create the recessed mirror shelf. The method also includes depositing a third spacer material on the second metal layer. The method includes etching the third spacer material. The method also includes depositing a third metal layer on the third spacer material and the second metal layer to create a top surface of a micromirror. The method includes removing the first spacer material, the second spacer material, and the third spacer material to release the recessed mirror shelf, the hinge, the one or more spring tips, and the micromirror.

In accordance with at least one example of the description, a system includes a DMD. The DMD includes a hinge and one or more spring tips coupled to the hinge, where the hinge is configured to tilt toward a raised address electrode. The DMD includes a micromirror including a recessed mirror shelf and a reflective surface, where the recessed mirror shelf is coupled to the hinge, and where the recessed mirror shelf is configured to contact at least one of the one or more spring tips responsive to the hinge tilting toward the raised address electrode.

BRIEF DESCRIPTION OF THE DRAWINGS

The same reference numbers or other reference designators are used in the drawings to designate the same or similar (functionally and/or structurally) features.

DETAILED DESCRIPTION

Figure 1A:
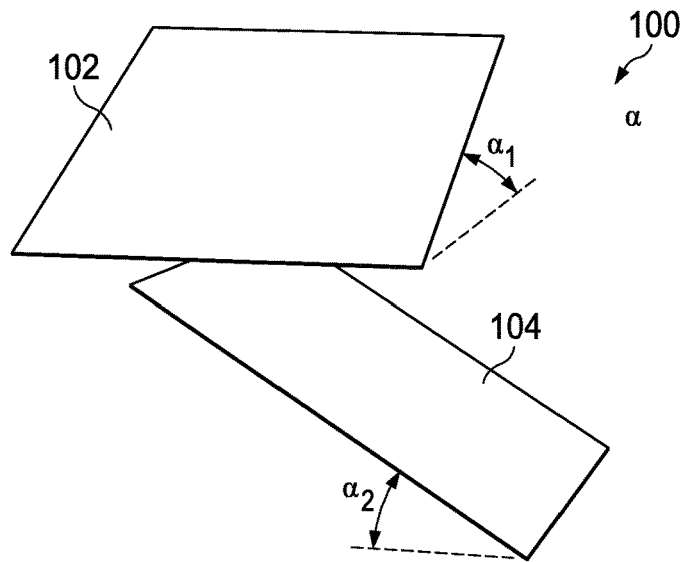
FIG. 1A shows contact between flat surfaces in accordance with various examples.

Static friction (or stiction) is a force that exists between stationary objects in contact with one another. Stiction must be overcome for the objects to move relative to one another. The forces responsible for stiction may be capillary and Van der Waals forces. In MEMS devices, capillary forces from the surface tension of liquids used during manufacturing may cause two surfaces to adhere together. Van der Waals forces are interactions between atoms or molecules of surfaces in close proximity to one another. Because of the small size of MEMS devices, small amounts of stiction between moving parts may cause failures in the device, or prevent the device from operating to its full potential. The magnitude of stiction between surfaces is dictated in part by the size of the contact area between the two surfaces.

In examples herein, the contact edges between two surfaces in a MEMS device are manufactured to be sharp edges, with a small radius of curvature (ROC). These sharp edges reduce the size of the contact area between two surfaces, between two edges, or between a surface and an edge. Sharp edges may be created by using deposition and etching techniques to create etched edges with a small ROC. Reduced contact area between two surfaces or edges produces less stiction between the two contacting surfaces or edges. Reducing the contact area between two surfaces or edges is useful for reducing stiction in any type of MEMS device. The examples herein are particularly useful in MEMS actuators, where a component of the MEMS device is configured to move mechanically and contact at least one other surface or edge. In one example described below, a rotating mirror in a DMD tilts until it rests on a stop, called a spring tip. Stiction may occur between the mirror and the spring tip and cause failure of the device. A recessed portion (also referred to as a recessed mirror shelf) on the underside of the mirror may be fabricated as described herein to rest on the spring tip. The recessed mirror shelf may have a sharp edge with a small ROC that reduces the size of the contact area between the mirror and the spring tip. In some examples, the spring tip may have a sharp edge with a small ROC as well. The smaller contact area reduces stiction between the mirror and the spring tip. In another example, an edge of the mirror is fabricated to have a retrograde edge (e.g., a negatively sloped or caved edge). The retrograde edge reduces the size of the contact area between the mirror and the spring tip.

In another example, a mirror may be created with a notch, where the mirror contacts the spring tip at an edge of the notch. This example also reduces the size of the contact area between the mirror and the spring tip. In another example, the mirror is reduced in size so the edge of the mirror contacts the spring tip, rather than the underside of the mirror. In another example, an extension to the spring tip may be manufactured so the edge of the mirror contacts the extension, rather than the underside of the mirror contacting the un-extended spring tip.

DMDs are described as one example herein. However, the techniques described herein may be applied to any MEMS device where stiction between two surfaces is overcome. Other types of MEMS devices where examples herein are useful include variable capacitors, where MEMS switches operate to switch between different capacitors. MEMS devices that include levers, cantilevers, gears, hinges, or other mechanical components may be manufactured using the techniques described herein to reduce stiction. Other MEMS devices where stiction may be reduced using the examples described herein include scratch drive actuators, inchworm motors, electrostatic relays, thermal actuators, and magnetic actuators.

FIG. 1A is a diagram 100 that shows two flat surfaces contacting one another at non-parallel instances. Surface 102 resides at an angle of α1, while surface 104 resides at an angle of α2. The angles α1 and as are different angles in this example, and therefore surface 102 and surface 104 are non-parallel. The contact area between surface 102 and surface 104 may be a small junction. The junction is made smaller if the edges of surface 102 and surface 104 are sharp, with a small ROC.

Figure 1B:
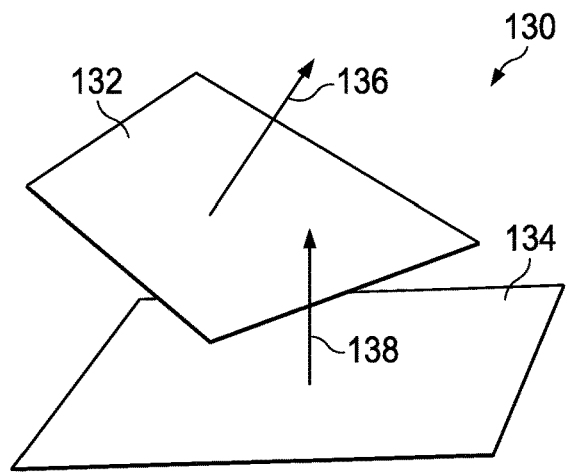
FIG. 1B shows contact between flat surfaces in accordance with various examples.

FIG. 1B is a diagram 130 that shows two flat surfaces contacting one another at non-parallel instances. Surface 132 and surface 134 contact one another in this example. Surface 132 includes the normal vector 136 extending from the center of surface 132. The normal vector is the vector that is perpendicular to the surface at a given point. Here, surface 134 includes the normal vector 138 extending from the center of surface 134. If normal vectors 136 and 138 are not in the same direction, the contact area between surface 132 and surface 134 may be a point.

Figure 1C:
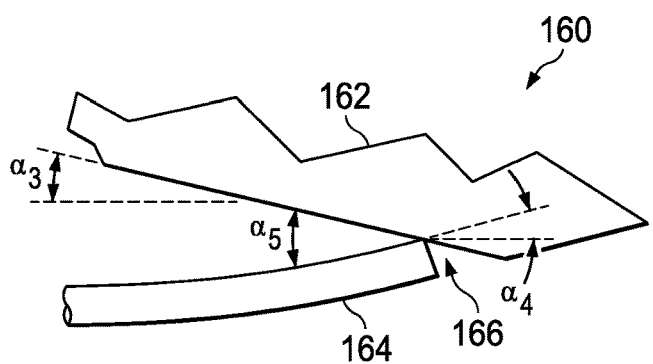
FIG. 1C shows contact between a mirror and a spring tip in accordance with various examples.

FIG. 1C is a diagram 160 that shows a mirror contacting a spring tip in accordance with various examples herein. A portion of mirror 162 of a DMD is shown, with a portion of spring tip 164. Mirror 162 contacts spring tip 164 at contact area 166. The size of the contact area 166 is determined in part by the sharpness of the edges of mirror 162 and spring tip 164. In diagram 160, the underside of mirror 162 resides at an angle of α3 with respect to a horizontal reference line. The top side of spring tip 164 resides at an angle of α4 with respect to the horizontal reference line. Therefore, the angle of contact between mirror 162 and spring tip 164 is α3+α4, or as. In one example, α3 may be 12°, while α4 is 3°. Therefore, as is 15° in this example. The angle between mirror 162 and spring tip 164 also affects the size of the contact area 166, which in turn affects the amount of stiction between mirror 162 and spring tip 164. Stiction may be reduced by reducing the size of the contact area between two surfaces, as described herein.

Figure 2:
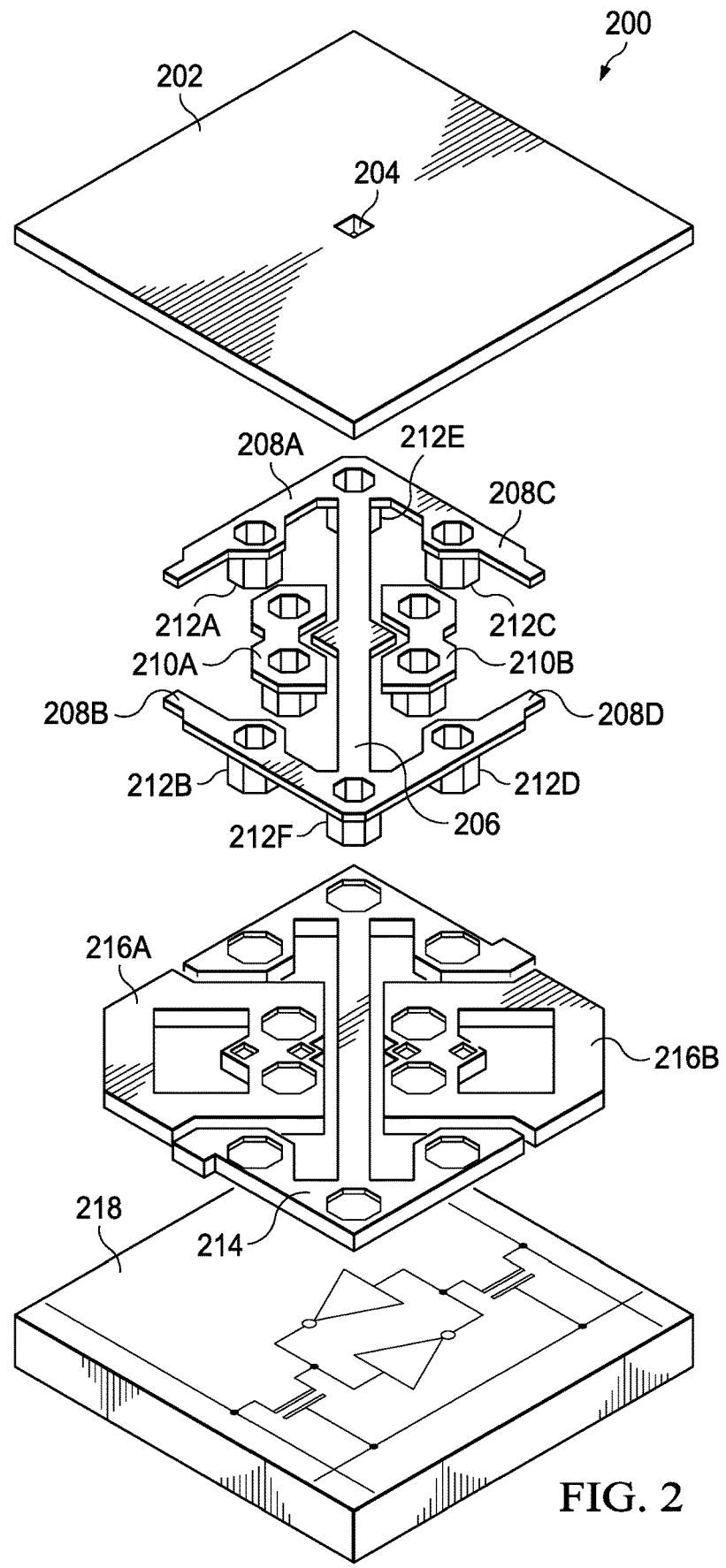
FIG. 2 is a schematic diagram of a system for reducing stiction in a DMD in accordance with various examples.
Figure 3:
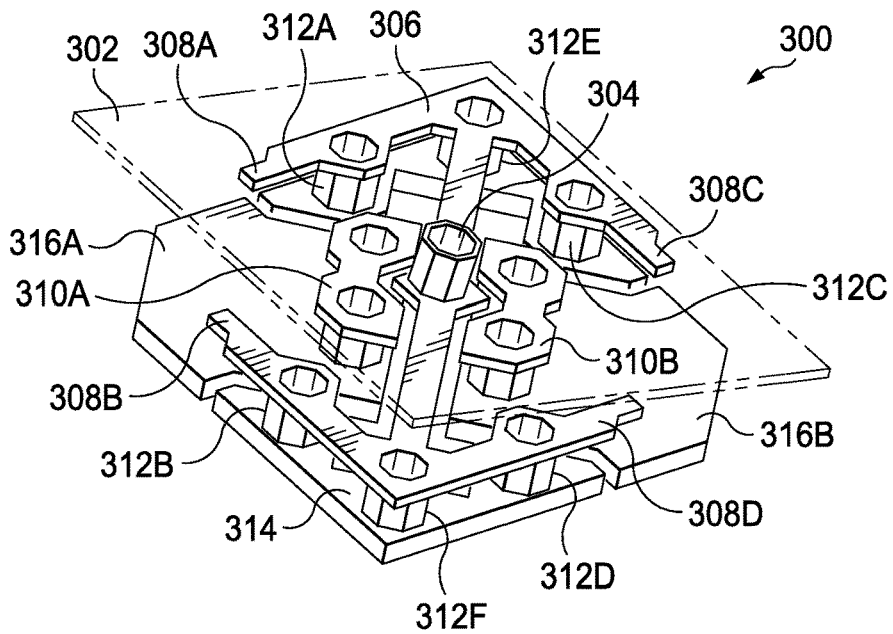
FIG. 3 is a schematic diagram of a system that includes a micromirror with a recessed mirror shelf in accordance with various examples.

FIG. 2 is a schematic diagram of a system 200 for reducing stiction in a DMD in accordance with various examples herein. FIG. 2 is an exploded view of a micromirror of a DMD and the understructure that controls the micromirror. While not visible in FIG. 2, the micromirror has a recessed mirror shelf that reduces stiction between the micromirror and a spring tip. The recessed mirror shelf is described with respect to FIGS. 4A-4G and 5 below. FIGS. 2 and 3 show and describe the operation of the micromirror of a DMD, and how the micromirror interacts with the spring tip.

A DMD is a MEMS device that has on its surface an array of several hundred thousand or millions of microscopic mirrors (e.g., micromirrors). The terms mirror and micromirror may be used interchangeably herein. The mirrors may be made of aluminum in one example. Each micromirror corresponds to a pixel in an image from light that is projected onto the micromirrors and then reflected from the micromirrors to a display. The micromirrors can be individually rotated (±10°, ±12°, ±14.5°, or ±17° in various examples) to an on or off state. As the micromirrors are rotated, they rest on a spring tip as described above, which may create stiction between the micromirrors and the spring tips. The on or off status of each micromirror is programmed so the image will be reflected onto the display. In the on state, light from a projector bulb is reflected from the micromirror to a lens, making a pixel appear bright on the display. In the off state, the light is reflected elsewhere (away from the lens and onto a heatsink), making the pixel appear dark on the display. Rapidly toggling the micromirror between the on and off states produces grayscales on the display, which are controlled by the ratio of on-time to off-time. Also, colored light is projected towards the micromirrors to produce color images.

System 200 includes micromirror 202, mirror via 204, hinge 206, spring tips 208A, 208B, 208C, and 208D (collectively, spring tips 208), first raised address electrode 210A and second raised address electrode 210B (collectively, raised address electrodes 210). System 200 also includes hinge support vias 212A, 212B, 212C, 212D, 212E, and 212F (collectively hinge support vias 212), reset bus 214, first address pad 216A, second address pad 216B, and complementary metal-oxide-semiconductor (CMOS) memory cell 218.

Mirror via 204 is shown at the center of micromirror 202. Mirror via 204 is coupled to micromirror 202 and hinge 206. Hinge 206 is a torsion hinge in this example. Hinge 206 runs diagonally along the bottom of micromirror 202. Hinge 206 allows micromirror 202 to be rotated or tilted to either the "on" or "off" state. In this example, hinge 206 is configured to tilt micromirror 202 to either the left or the right. Hinge 206 tilts micromirror 202 a specific number of degrees in either direction. For example, micromirror 202 may tilt ±10°, ±12°, ±14.5°, or ±17° in various examples. Other tilt angles are useful in other examples.

Hinge 206 is coupled to four spring tips 208A, 208B, 208C, and 208D (collectively spring tips 208). Spring tips 208 provide a stopping point for micromirror 202 as micromirror 202 rotates. For example, as micromirror 202 rotates to the left due to the rotation of hinge 206, micromirror 202 rotates until the underside of micromirror 202 comes into contact with spring tips 208A and 208B. These contact points create stiction between micromirror 202 and spring tips 208A and 208B. As micromirror 202 rotates to the right due to the rotation of hinge 206, micromirror 202 rotates until the underside of micromirror 202 comes into contact with spring tips 208C and 208D. Micromirror 202 lands on the spring tips 208 and therefore this structure is referred to as a landed micromirror. System 200 is designed so micromirror 202 is at the programmed tilt angle after micromirror 202 lands on the spring tips 208. As described below, micromirror 202 includes a recessed mirror shelf on its underside that reduces stiction between micromirror 202 and spring tips 208.

Address voltages are applied to first raised address electrode 210A and second raised address electrode 210B during the operation of system 200. Hinge support vias 212 couple hinge 206 to reset bus 214 (also called a bias/reset bus). In an example operation, a DMD is used in conjunction with a digital controller chip. Each individual micromirror (such as micromirror 202) is positioned over a corresponding CMOS memory cell (such as CMOS memory cell 218). The angular position of a particular micromirror (e.g., the on or off state) is determined by the binary state (logic 0 or 1) of the corresponding CMOS memory cell contents after a micromirror clocking pulse is applied. Setting the position of micromirror 202 occurs electrostatically. The output of the CMOS memory cell 218 and its complement control the opposite potentials applied to raised address electrodes 210A and 210B located below micromirror 202 on respective sides of the axis of hinge 206. Responsive to an appropriate bias/reset potential applied to the micromirror 202 assembly via reset bus 214, micromirror 202 tilts about its hinge 206 axis in attraction to the raised address electrode (210A or 210B) with the greatest potential difference relative to the bias/reset potential. Micromirror 202 lands on the spring tips 208 closest to that raised address electrode 210, preventing contact of micromirror 202 with the raised address electrode 210. If the bias/reset potential is removed (e.g., allowed to float or set to 0 volts), micromirror 202 returns to a flat state.

As described above, stiction between micromirror 202 and spring tips 208 may impede the rotation of micromirror 202 to a new position. Stiction may cause the micromirror 202 to get "stuck" on spring tips 208, causing a failure of the DMD, or causing a reduction in optical quality of the image produced by the DMD. In examples herein, the recessed shelf on the underside of micromirror 202 reduces stiction by reducing the size of the contact area between micromirror 202 and spring tips 208.

FIG. 3 is a schematic diagram of a system 300 that includes a micromirror 302 with a recessed mirror shelf in accordance with various examples. The recessed mirror shelf is not visible in FIG. 3. In FIGS. 2 and 3, like numerals refer to like parts (such as 206 and 306 refer to the hinge, 212 and 312 refer to hinge support vias, etc.). System 300 is a non-exploded view of a micromirror, hinge, address electrodes, and bias/reset bus to show the structure of the components described above with respect to FIG. 2. Micromirror 302 is shown as transparent so the other components are visible. System 300 includes micromirror 302 coupled to mirror via 304. Mirror via 304 is coupled to hinge 306. Spring tips 308A, 308B, 308C, and 308D (collectively, spring tips 308) are coupled to hinge 306. Raised address electrodes 310A and 310B are located on each side of the axis of hinge 306. Hinge support vias 312A, 312B, 312C, 312D, 312E, and 312F (collectively, hinge support vias 312) are coupled to hinge 306 and also coupled to bias/reset bus 314. Metal address pads 316A and 316B are coupled to raised address electrodes 310A and 310B. In this example, micromirror 302 is tilted to the right where the underside of micromirror 302 is configured to contact spring tips 308C and 308D, which places micromirror 302 in one of its programmed landing position.

FIGS. 4A-4G are diagrams of a process cross-section for a device 400 that includes a micromirror with a recessed mirror shelf in accordance with various examples herein. The steps shown in FIGS. 4A-4G include steps of a manufacturing process for device 400. Other steps may be included in other examples. Also, one or more of the steps shown in FIGS. 4A-4G may be removed or combined in other examples. Some steps, such as planarization and etching steps, may be combined or omitted for simplicity. The steps may be performed in any suitable order. The components shown in FIGS. 4A-4G are not necessarily to scale. FIGS. 4A-4G are conceptual diagrams that show various components of device 400, and the components shown in these figures may not correspond to an exact cross-section of a finished device 400.

Figure 4A:
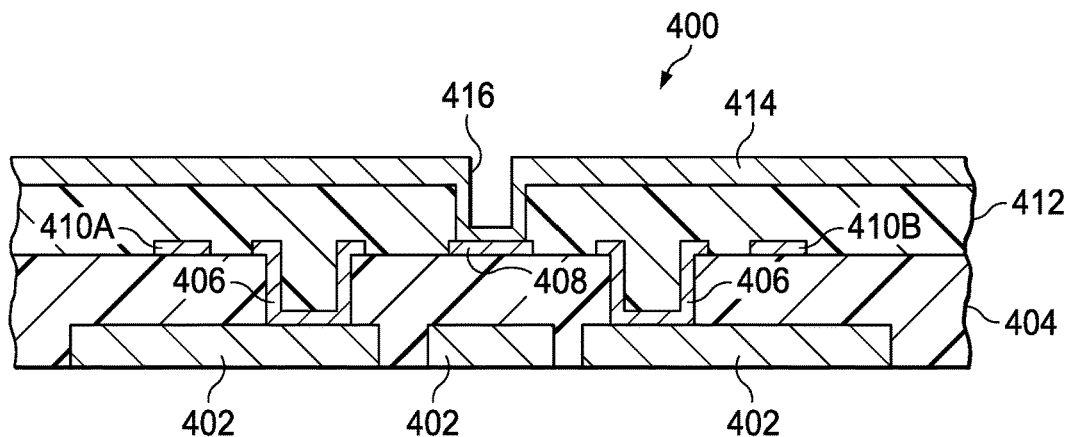
FIGS. 4A-4G are diagrams of a process cross-section for a device that includes a micromirror with a recessed mirror shelf in accordance with various examples.

FIG. 4A shows a cross-section of device 400 after certain components of the device 400 have been manufactured using existing processes. At this stage, device 400 includes an electrode 402. Electrode 402 may represent multiple electrodes in some examples. Spacer 1 404 has been deposited on electrode 402 and patterned to produce support vias 406. Also, hinge 408 and spring tips 410A and 410B (collectively, spring tips 410) have been created on spacer 1 404 using any suitable process. Spacer 2 412 is deposited on spacer 1 404 and patterned. Mirror 414 is deposited on spacer 2 412 to create a first layer for the mirror, as well as mirror via 416.

Spacer 1 404 and spacer 2 412, along with other spacer layers, are removed at the end of the manufacturing process. Spacer 1 404 and spacer 2 412 may be photoresist in one example. Spacer 1 404 and spacer 2 412 are sacrificial layers that are removed to release the components of the micromirror device 400. Spacer 1 404 and spacer 2 412 may be removed using one or more dry or wet etching steps in one example. In one example, a liquid solution dissolves the material of spacer 1 404, spacer 2 412, and other spacers, leaving the remaining structures in place.

Support vias 406, hinge 408, and spring tips 410 are metal layers that may be aluminum alloy in one example. Mirror 414 is also a metal layer that may be aluminum alloy in one example. The metal layers may be formed using a sputtered metal deposition process in one example.

Figure 4B:
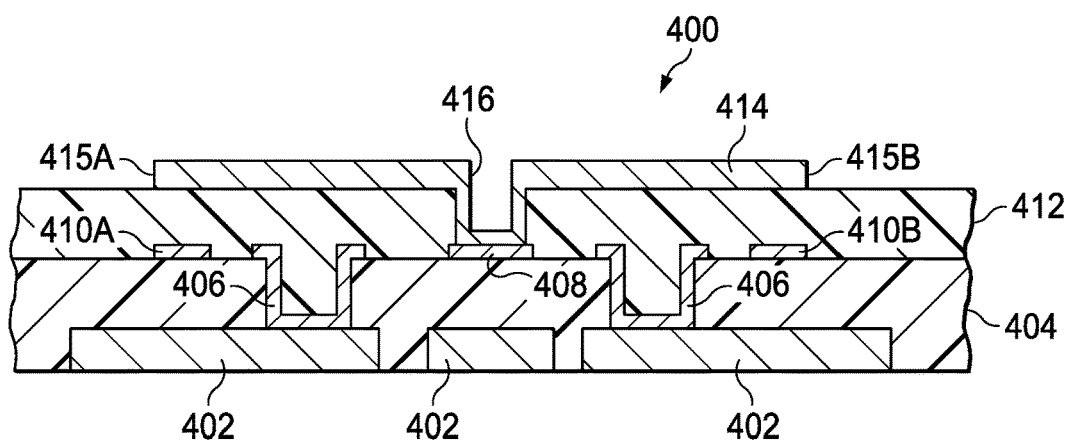

FIG. 4B shows device 400 after mirror 414 is etched to create the recessed mirror shelf of the mirror 414. In this cross-section, the left edge 415A and right edge 415B of the mirror 414 are etched, as those portions of the mirror 414 will contact spring tips 410A and 410B during operation. In examples herein, any portions of mirror 414 may be etched. In some examples, some other portions or edges of mirror 414 may not be etched, if those edges will not contact a spring tip 410 during operation.

Figure 4C:
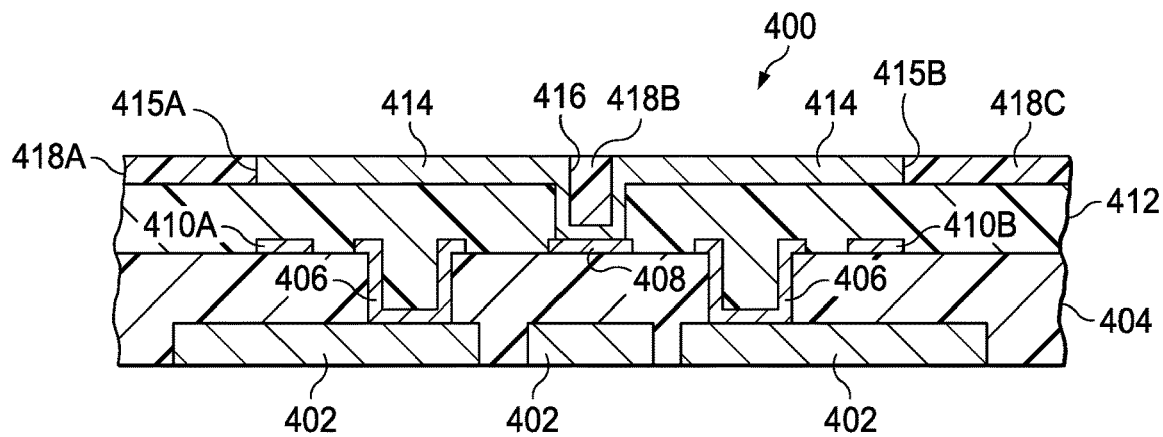

FIG. 4C shows device 400 after spacer 3 418 has been deposited on device 400. Spacer 3 418 is shown as three pieces: 418A, 418B, and 418C in this example. Spacer 3 418 may be a similar material to spacer 1 404 and spacer 2 412 in one example. Spacer 3 418 is also a sacrificial material that is removed near the end of the manufacturing process of device 400 in order to release the micromirror and the understructure beneath it.

Figure 4D:
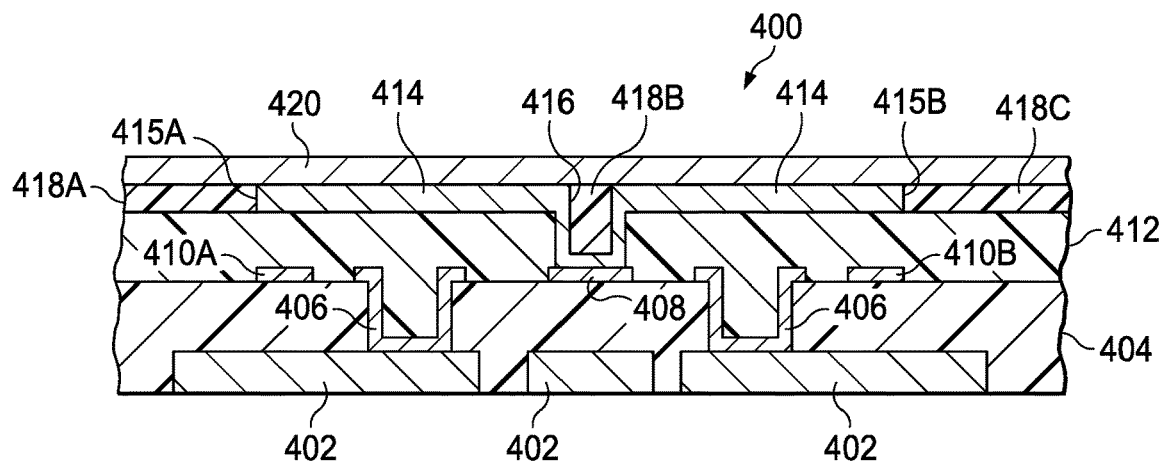

FIG. 4D shows device 400 after deposition of a metal layer to complete the mirror. The deposition of this layer is labeled mirror 420 in FIG. 4D. Mirror 420 and mirror 414 are two metal layers that complete the mirror. These two layers may be aluminum alloys in one example. In another example, one or more of mirror 414 and mirror 420 may be an oxide or a nitride, such as titanium nitride, silicon nitride, aluminum nitride, etc. The bottom layer (mirror 414) is recessed, and therefore creates the recessed mirror shelf that is configured to contact spring tips 410. The top layer (mirror 420) is the top side of the micromirror that reflects light during operation.

Figure 4E:
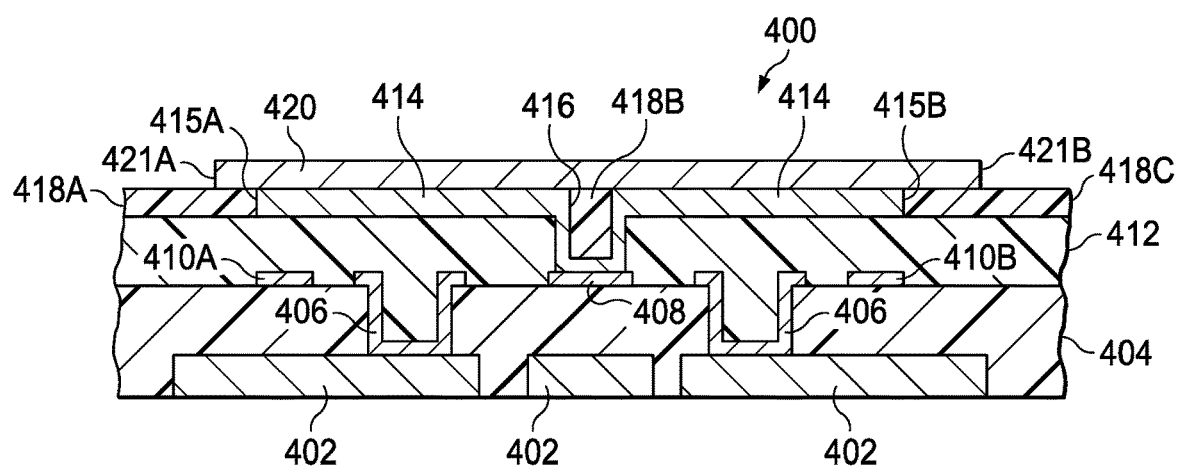

FIG. 4E shows device 400 after mirror 420 is patterned and etched along its edges to create the mirror gaps between adjacent micromirrors in an array of micromirrors. Mirror 420 has left edge 421A and right edge 421B. The etching is seen along edges 421A and 421B of mirror 420 in FIG. 4E. A portion of spacer 3 418A and 418C is exposed in this step.

Figure 4F:
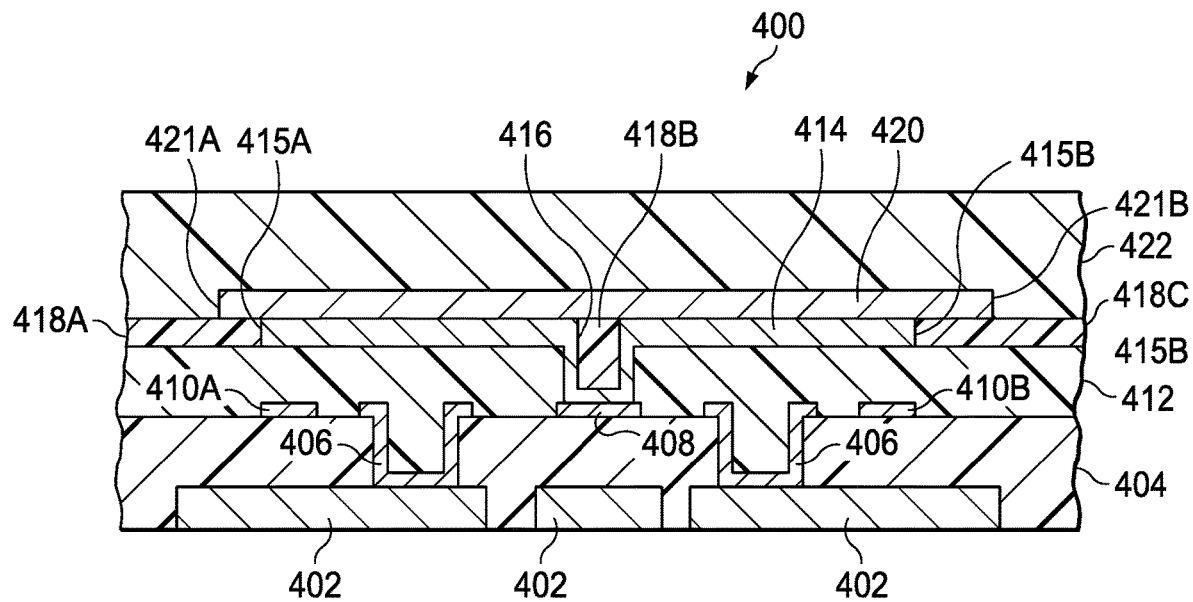

FIG. 4F shows device 400 after pattern resist 422 is deposited on device 400. Pattern resist 422 may be a saw prep photoresist. The pattern resist 422 protects device 400 from debris created during the saw process that separates the wafer into individual dies.

Figure 4G:
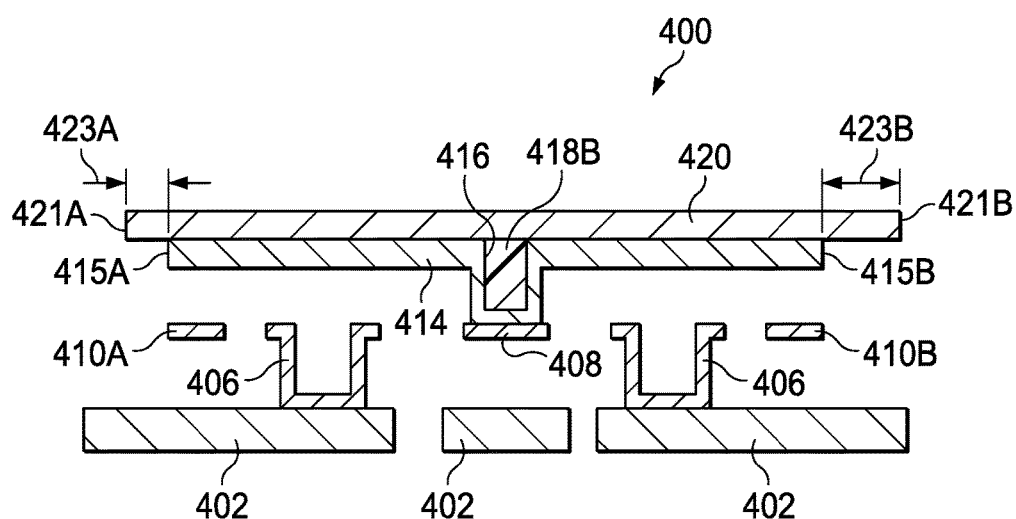

FIG. 4G shows device 400 after pattern resist 422, spacer 1 404, spacer 2 412, and spacer 3 418 have been removed. These materials may be removed using any suitable process for removing resist and/or sacrificial layers. Removing these materials releases the micromirror and its understructure as shown in FIG. 4G. The mirror of device 400 includes the recessed mirror shelf created by mirror 414, with mirror 420 on the top side of device 400. Edge 421A extends beyond edge 415A by a distance represented by distance 423A, and edge 421B extends beyond edge 415B by a distance represented by distance 423B. Edges 421A and 421B may extend any suitable distance beyond edges 415A and 415B, respectively. Distances 423A and 423B may be the same or may be different in some examples. As one example, distances 423A and/or 423B may be less than approximately ten times the thickness of mirror 414. Distances 423A and/or 423B may be larger or smaller than approximately ten times the thickness of mirror 414 in other examples. As the mirror of device 400 tilts during operation, the recessed mirror shelf of mirror 414 contacts spring tip 410A or spring tip 410B. Mirror 414 is patterned to have a sharp edge with a small ROC. In some examples, the ROC is 10 to 50 nanometers. In other examples, the ROC is between 10 and 20 nanometers. This small ROC provides a small contact area as the edge of mirror 414 contacts spring tip 410. The small contact area reduces stiction between mirror 414 and spring tip 410.

Figure 5:
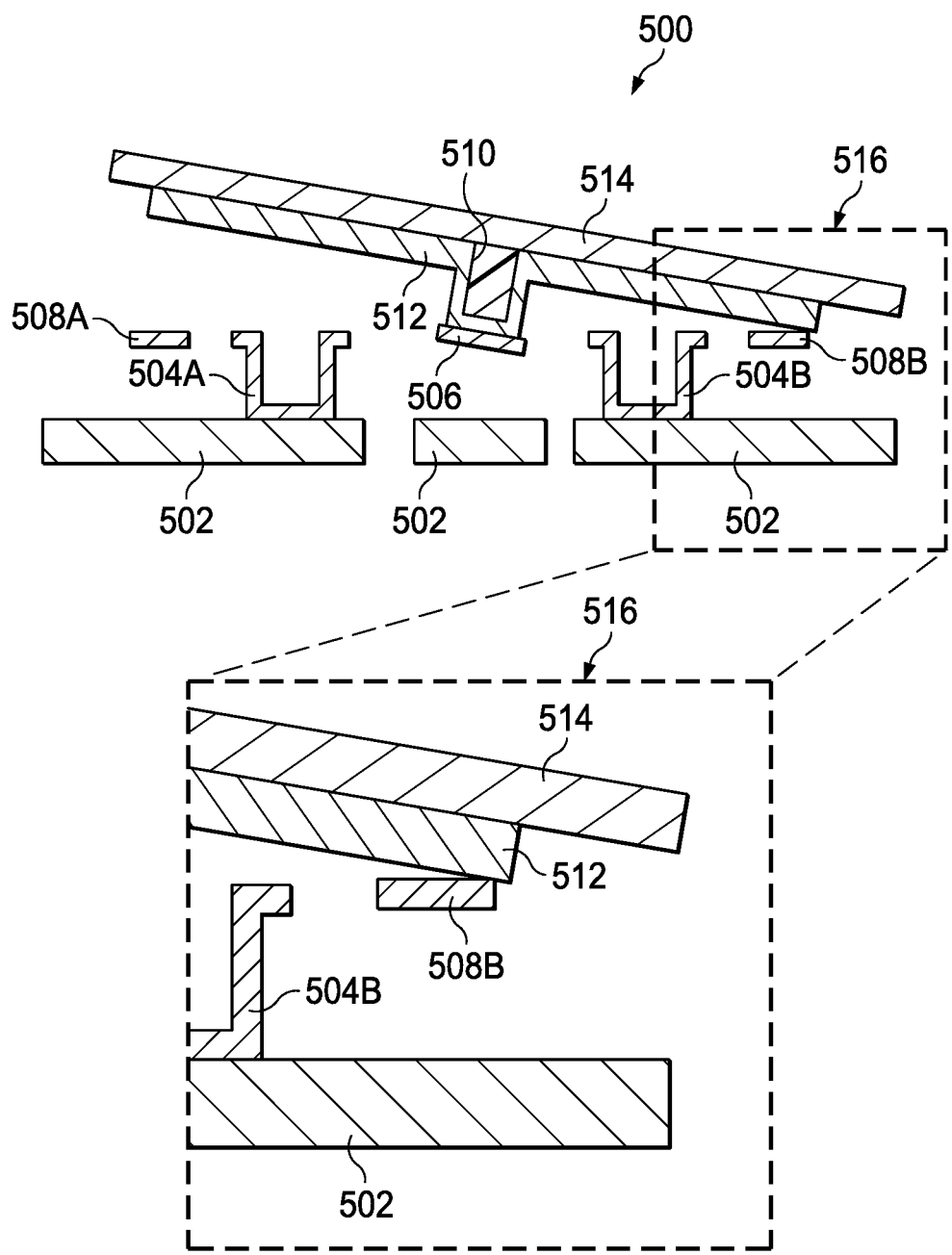
FIG. 5 is a schematic diagram of a micromirror device with a recessed shelf in accordance with various examples.

FIG. 5 is a schematic diagram of a micromirror device 500 with a recessed mirror shelf in accordance with various examples herein. FIG. 5 shows micromirror device 500 as it is tilted to the right. Micromirror device 500 includes electrode 502, support vias 504A and 504B (collectively, support vias 504), hinge 506, spring tips 508A and 508B (collectively, spring tips 508), mirror via 510, mirror shelf 512, and top mirror layer 514. FIG. 5 also includes section 516, which is magnified to show the details of this portion of micromirror device 500. In this example, mirror shelf 512 is configured to contact spring tip 508A or spring tip 508B depending on which direction the micromirror device 500 is tilted. The contact may be edge-to-edge contact or edge-to-surface contact.

In the magnified portion of section 516, micromirror device 500 is tilted to the right and mirror shelf 512 is in contact with spring tip 508B. Because mirror shelf 512 is in contact with spring tip 508B rather than the top mirror layer 514, the area of contact between mirror shelf 512 and spring tip 508B is small. The edge of mirror shelf 512 has a small ROC, such as 10 to 50 nanometers, and this edge contacts spring tip 508B in a small area. Therefore, stiction between mirror shelf 512 and spring tip 508B is reduced via the use of the mirror shelf 512. In another example, the edge of mirror shelf 512 may contact an edge of spring tip 508B. The edge of spring tip 508B may be patterned to have a small ROC, such as 10 to 50 nanometers. This edge-to-edge contact may exhibit reduced stiction compared to a surface-to-surface contact.

Figure 6:
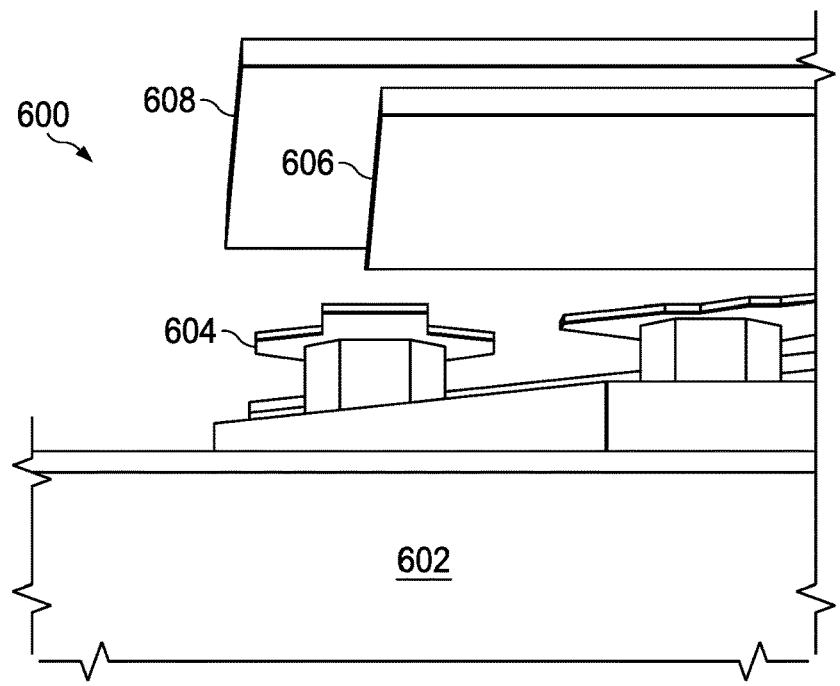
FIG. 6 is an isometric view of a portion of a micromirror device in accordance with various examples.

FIG. 6 is an isometric view of a portion of micromirror device 600 in accordance with various examples herein. Micromirror device 600 includes electrode 602, spring tip 604, mirror shelf 606, and top mirror layer 608. Micromirror device 600 is similar to micromirror device 500 in FIG. 5 in one example. In micromirror device 600, as the mirror shelf 606 and top mirror layer 608 tilt toward the left, mirror shelf 606 contacts spring tip 604. In one example, mirror shelf 606 is constructed according to the steps described above in FIGS. 4A-4G. Therefore, mirror shelf 606 has an edge with an ROC of 10 to 50 nanometers. Because mirror shelf 606 is constructed in this manner, the area of contact between mirror shelf 606 and spring tip 604 is small. This small contact area reduces stiction between mirror shelf 606 and spring tip 604.

Figure 7A:
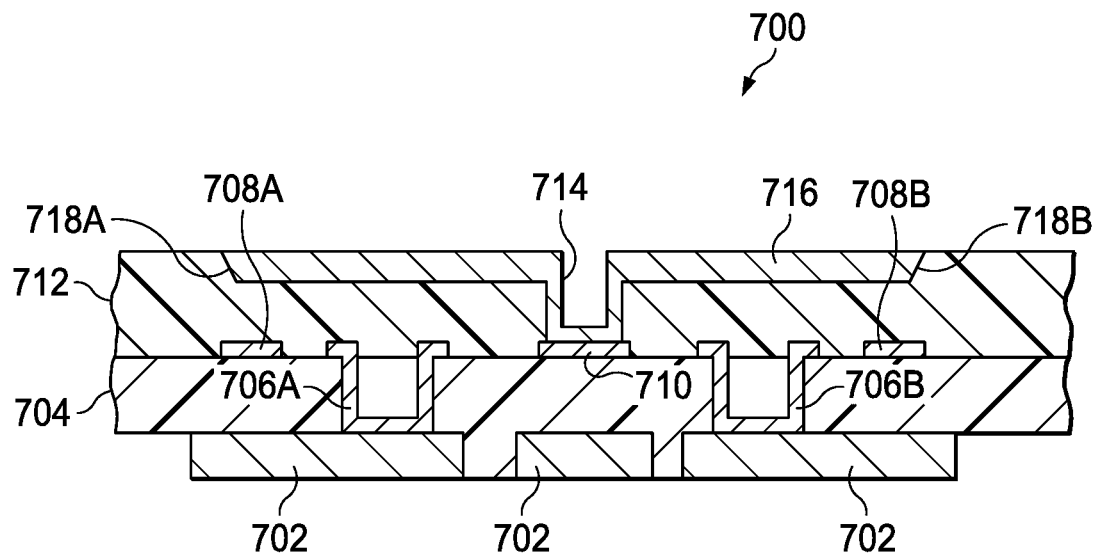
FIG. 7A is a cross-section diagram of a micromirror device in accordance with various examples.
Figure 7B:
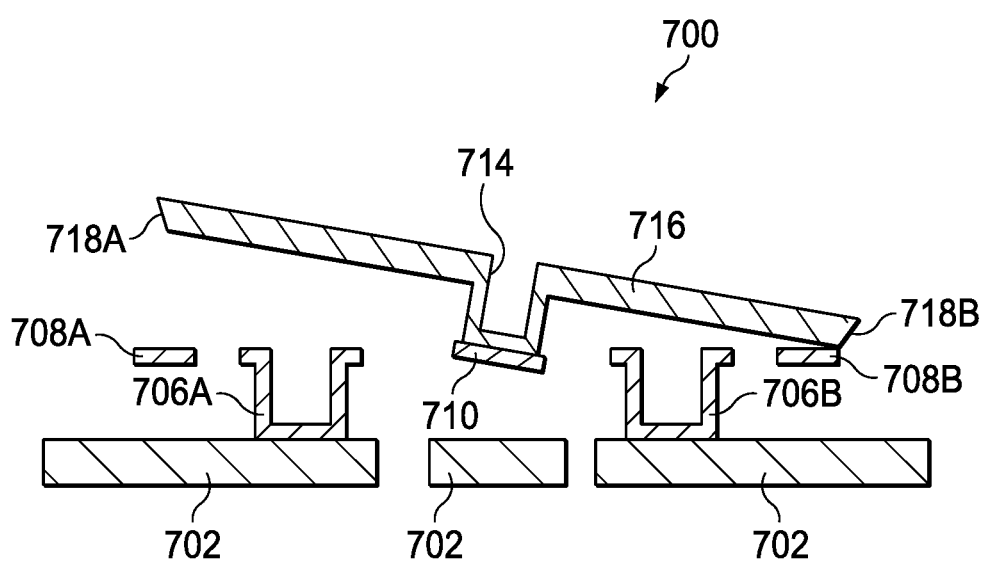
FIG. 7B is a micromirror device with sacrificial layers removed in accordance with various examples.

FIG. 7A is a cross-section diagram of a micromirror device 700 with a retrograde mirror edge in accordance with various examples herein. In an example, a retrograde mirror edge is a negatively sloped or caved edge. The bottom side of the edge contacts the spring tip in this example, reducing the size of the contact area with the spring tip. FIG. 7A shows micromirror device 700 with the sacrificial layers still in place. FIG. 7B, described below, shows micromirror device 700 with the sacrificial layers removed.

In FIG. 7A, micromirror device 700 includes electrode 702, spacer 1 704, support vias 706A and 706B (collectively, support vias 706), spring tips 708A and 708B (collectively, spring tips 708), and hinge 710. Micromirror device 700 also includes spacer 2 712, mirror via 714, mirror 716, and retrograde edges 718A and 718B (collectively, retrograde edges 718). Micromirror device 700 may be constructed using similar processes to the processes described above with respect to FIGS. 4A-4G. Other techniques are useful in other examples. Any suitable patterning or etching technique is useful to create retrograde edges 718.

FIG. 7B shows micromirror device 700 with sacrificial layers spacer 1 704 and spacer 2 712 removed. FIG. 7B shows micromirror device 700 in operation, where micromirror device 700 is tilted to the right. As shown in FIG. 7B, if mirror 716 is tilted in either direction, a retrograde edge 718 contacts a spring tip 708. The retrograde edge 718 may be constructed with an ROC of 10-50 nanometers. This sharp edge reduces the size of the contact area between mirror 716 and the spring tips 708. A smaller contact area reduces stiction.

Figure 8:
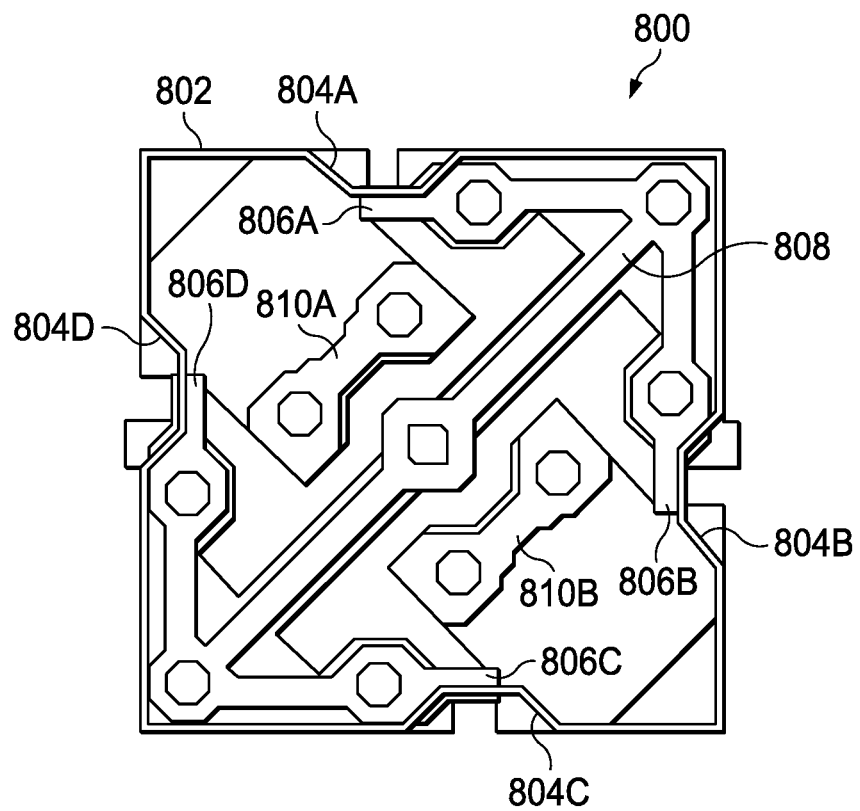
FIG. 8 is a micromirror device with a notched mirror in accordance with various examples.

FIG. 8 is a micromirror device 800 with a notched mirror in accordance with various examples herein. FIG. 8 is an overhead view of micromirror device 800. Micromirror device 800 includes mirror 802, notches 804A, 804B, 804C, and 804D (collectively, notches 804), spring tips 806A, 806B, 806C, and 806D (collectively, spring tips 806), hinge 808, and raised address electrodes 810A and 810B (collectively, raised address electrodes 810). Mirror 802 is shown as transparent in FIG. 8 so the components below mirror 802 are visible. Micromirror device 800 operates similarly to the DMD described above with respect to FIG. 2. Hinge 808 operates to tilt mirror 802 to reflect light to a specific location to produce images. In this example, mirror 802 tilts either to the upper left or to the lower right during operation. If mirror 802 tilts to the upper left, mirror 802 rests on spring tips 806A and 806D. If mirror 802 tilts to the lower right, mirror 802 rests on spring tips 806B and 806C. In this example, mirror 802 has notches 804. With these notches 804, the sharp edge of a notch 804 rests on a respective spring tip 806 rather than the underside of mirror 802 resting on the spring tips 806. Because mirror 802 is patterned with notches 804, the size of the contact area between mirror 802 and spring tips 806 is less than a mirror 802 that does not have notches 804. The edge of a notch 804 has a small ROC, in the range of 10-50 nanometers in one example. Therefore, the notches 804 reduce the amount of stiction between the mirror 802 and spring tips 806.

Figure 9:
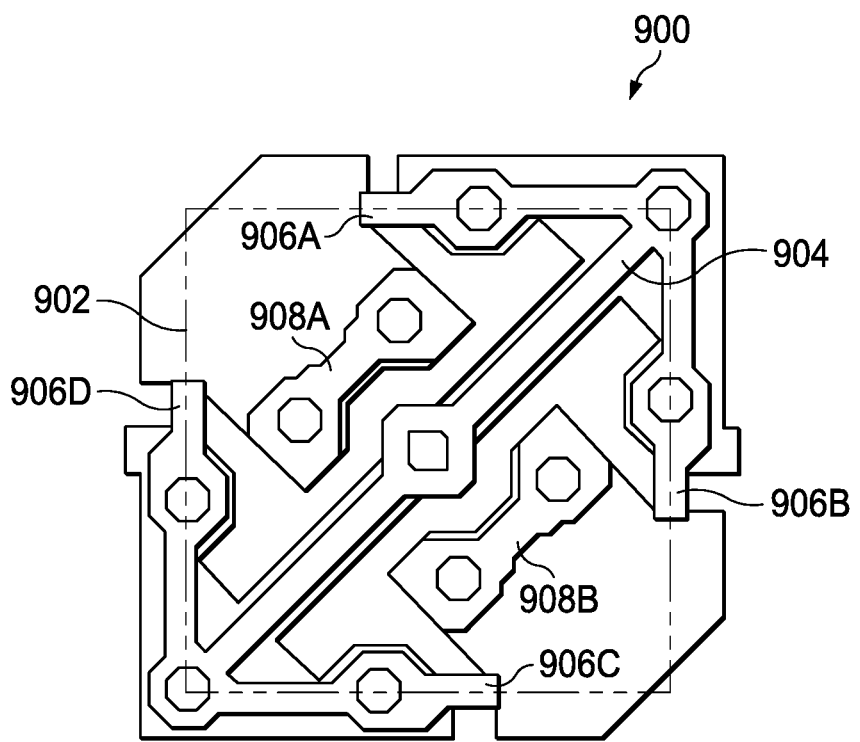
FIG. 9 is a micromirror device with an undersized mirror in accordance with various examples.

FIG. 9 is a micromirror device 900 with an undersized mirror in accordance with various examples herein. FIG. 9 is an overhead view of micromirror device 900. Micromirror device 900 includes mirror 902, hinge 904, spring tips 906A, 906B, 906C, and 906D (collectively, spring tips 906), and raised address electrodes 908A and 908B (collectively, raised address electrodes 908). Mirror 902 is shown as transparent in FIG. 9 so the components below mirror 902 are visible. Micromirror device 900 operates similarly to the DMD described above with respect to FIG. 2. Hinge 904 operates to tilt mirror 902 to reflect light to a specific location to produce images. In this example, mirror 902 tilts either to the upper left or to the lower right during operation. If mirror 902 tilts to the upper left, mirror 902 rests on spring tips 906A and 906D. If mirror 902 tilts to the lower right, mirror 902 rests on spring tips 906B and 906C.

With undersized mirror 902, an edge of mirror 902 rests on spring tips 906 rather than the flat underside of mirror 902. The edges of mirror 902 are manufactured with a small ROC, such as 10-50 nanometers. These sharp edges contact spring tips 906 if mirror 902 is in one of its tilted landing positions. Because the edges of mirror 902 contact spring tips 906 rather than the flat underside of mirror 902, the area of contact is reduced. Therefore, stiction is reduced between mirror 902 and spring tips 906.

Figure 10:
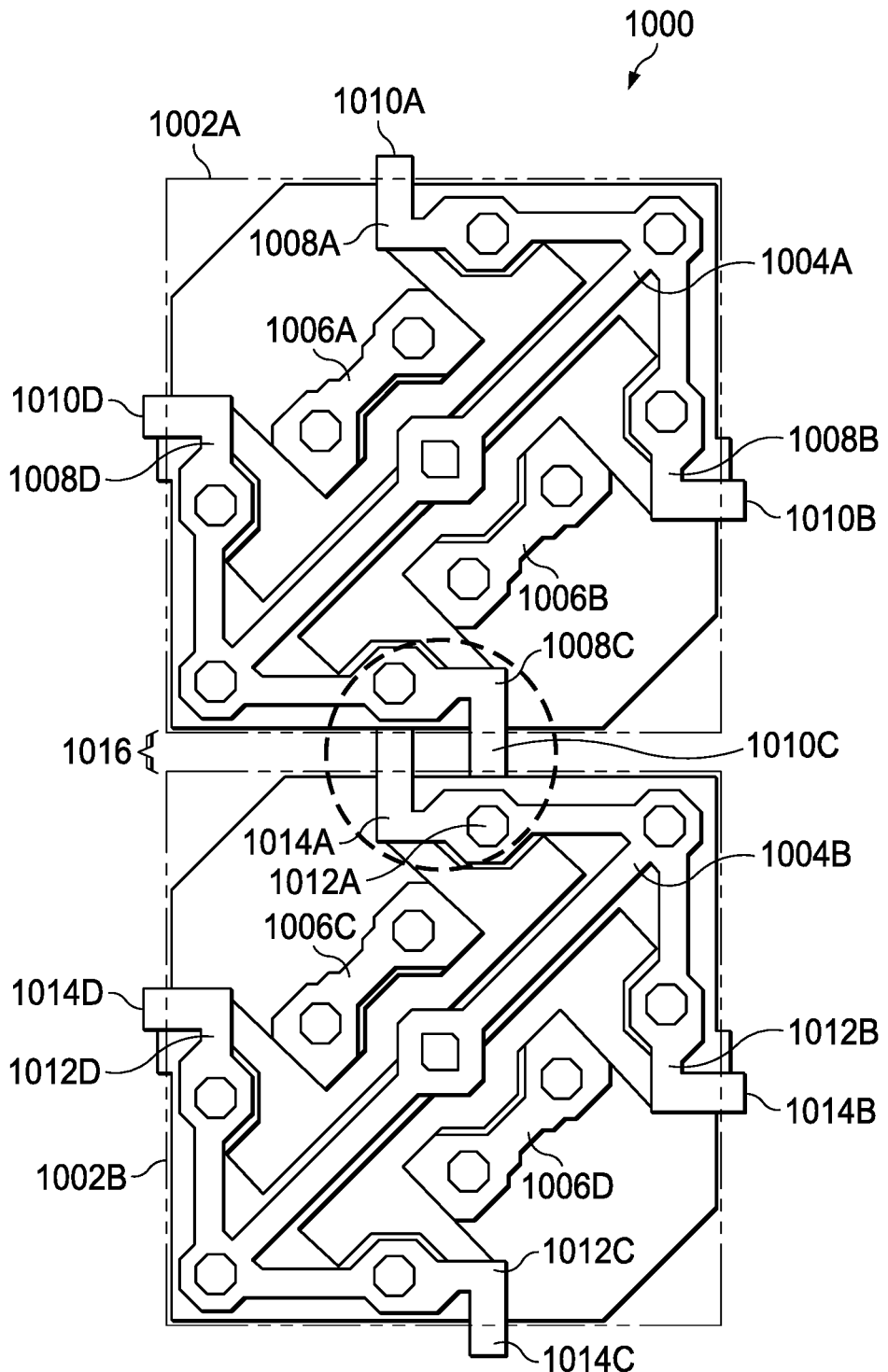
FIG. 10 is a micromirror device with spring tip extensions in accordance with various examples.

FIG. 10 is a micromirror device 1000 with spring tip extensions in accordance with various examples herein. FIG. 10 shows two micromirrors adjacent to one another, which may be two micromirrors of a micromirror array in one example. Micromirror device 1000 includes mirrors 1002A and 1002B. Mirrors 1002A and 1002B are shown as transparent in this example, so the components below mirrors 1002A and 1002B are visible. The portions of micromirror device 1000 below mirror 1002A include hinge 1004A, raised address electrodes 1006A and 1006B, spring tips 1008A, 1008B, 1008C, and 1008D (collectively, spring tips 1008), and spring tip extensions 1010A, 1010B, 1010C, and 1010D (collectively, spring tip extensions 1010). Spring tip extensions 1010 are the portions that extend at a right angle to the spring tips 1008, and in this example extend into a gap between mirrors, such as between mirrors 1002A and 1002B. The portions of micromirror device 1000 below mirror 1002B include hinge 1004B, raised address electrodes 1006C and 1006D, spring tips 1012A, 1012B, 1012C, and 1012D (collectively, spring tips 1012), and spring tip extensions 1014A, 1014B, 1014C, and 1014D (collectively, spring tip extensions 1014). FIG. 10 also shows a mirror gap 1016 between mirror 1002A and 1002B. Although not shown in FIG. 10, if mirrors 1002A and 1002B are part of an array of micromirrors, with additional mirrors surrounding mirrors 1002A and 1002B, then similar mirror gaps exist on the other sides of mirrors 1002A and 1002B.

In micromirror device 1000, spring tips (1008 and 1012) are each manufactured with an extension (e.g., 1010 and 1014) that extends into the mirror gaps, such as mirror gap 1016. Spring tip extensions 1010 and 1014 may be constructed of the same material as spring tips 1008 and 1012, which may be a metal alloy in one example. Spring tip extensions 1010 and 1014 allow an edge of the mirrors 1002A and 1002B to land on a respective spring tip extension 1010 and 1014, rather than the flat underside of the mirrors 1002A and 1002B landing on the spring tips 1008 and 1012. If the edge of mirrors 1002A and 1002B land on spring tip extensions 1010 and 1014, the size of the contact area is reduced compared to the flat underside of the mirrors 1002A and 1002B landing on spring tips 1008 and 1012. Reducing the size of the contact area reduces stiction between the mirrors (1002A and 1002B) and the spring tip extensions (1010 and 1014).

Figure 11:
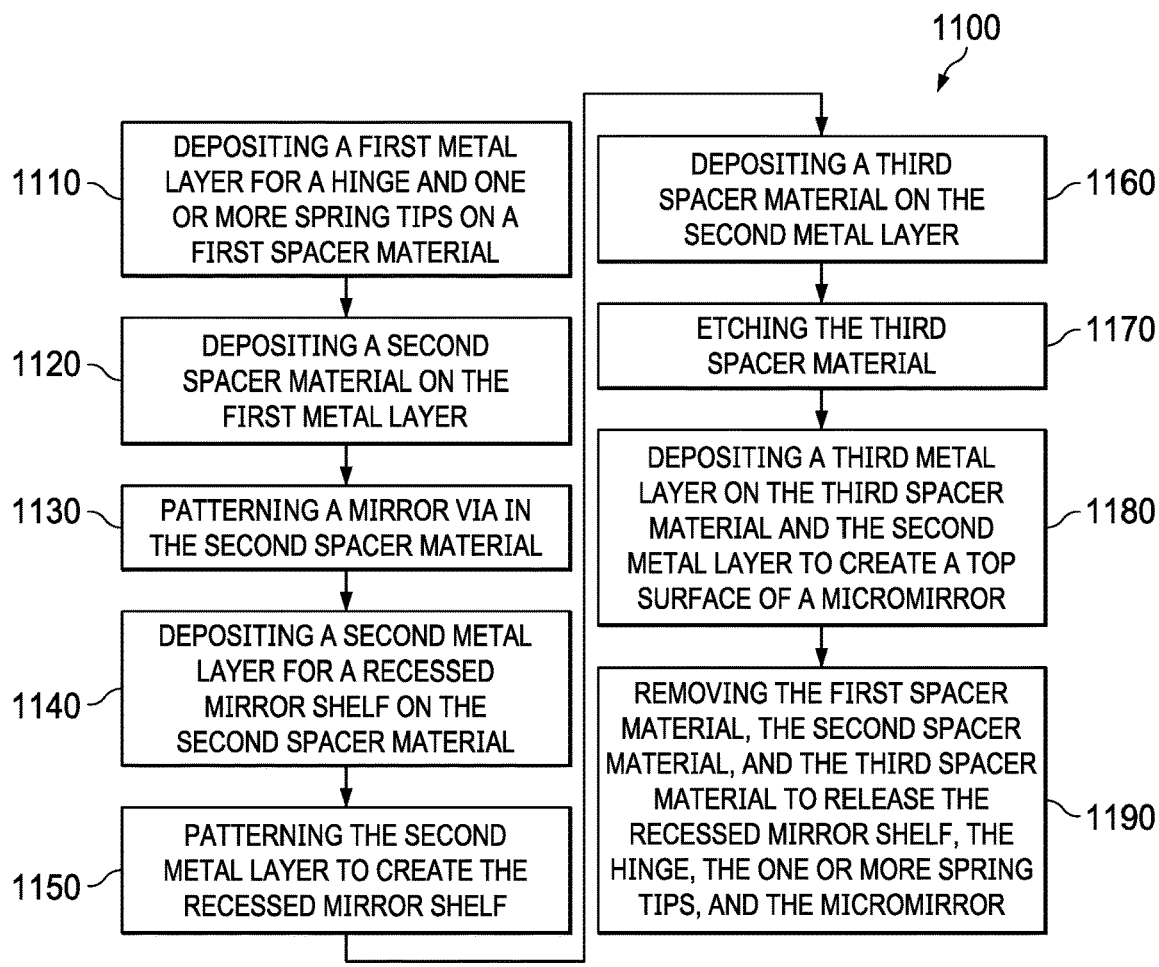
FIG. 11 is a flow diagram of a method for producing a MEMS device with reduced stiction in accordance with various examples.

FIG. 11 is a flow diagram of a method 1100 for producing a MEMS device in accordance with various examples herein. The steps of method 1100 may be performed in any suitable order, and additional steps may be included in some examples.

Method 1100 begins at step 1110, where a first metal layer for a hinge and one or more spring tips for a DMD are deposited on a first spacer material. The deposition of the first metal layer may be performed using any suitable technique. In one example, the first metal layers and other metal layers are formed using a sputtered metal deposition process. The first spacer material and other spacer materials may be photoresist in one example. The first spacer material may be patterned before the first metal layer is deposited to provide appropriate patterns for the hinge, spring tips, and other components, such as support vias. In one example, the first spacer material is spacer 1 404, the hinge is hinge 408, and the spring tips are spring tips 410A and 410B described above with respect to FIG. 4A.

Method 1100 continues at 1120, where a second spacer material is deposited on the first metal layer. The second spacer material may be photoresist in one example. The second spacer material may be spacer 2 412 described above with respect to FIG. 4A.

Method 1100 continues at 1130, where a mirror via is patterned in the second spacer material. The mirror via may be mirror via 416 as shown in FIG. 4A. Method 1100 continues at 1140, where a second metal layer is deposited for a recessed mirror shelf on the second spacer material. In one example, the second metal layer is formed using a sputtered metal deposition process. The second metal layer may be an aluminum alloy in one example. The second metal layer may be mirror 414 described above with respect to FIG. 4A.

Method 1100 continues at 1150, where the second metal layer is patterned to create a recessed mirror shelf. The patterning of the second metal layer may be performed by etching the edges of the second metal layer, while leaving the center of the second metal layer. The second metal layer may be etched as shown and described above with respect to FIG. 4B.

Method 1100 continues at 1160, where a third spacer material is deposited on the second metal layer. The third spacer material may be spacer 3 418 as described above with respect to FIG. 4C. The third spacer material may be photoresist in one example. Method 1100 continues at 1170, where the third spacer material is etched to leave the third spacer material in the mirror via and at the edges of the second metal layer. As one example, the third spacer material may be etched to produce the structure shown in FIG. 4C. In this example, third spacer material is left in mirror via 416 at near the edges of the second metal layer.

Method 1100 continues at 1180, where a third metal layer is deposited on the third spacer material and the second metal layer to create a top surface of a micromirror. The third metal layer may be an aluminum alloy in one example. The third metal layer may be mirror 420 as described above with respect to FIG. 4D. The third metal layer may be an aluminum alloy in one example. The third metal layer may be a reflective surface of a micromirror. The third metal layer may be formed using a sputtered metal deposition process in one example.

Method 1100 continues at 1190, where the first spacer material, the second spacer material, and the third spacer material are removed to release the recessed mirror shelf, the hinge, the one or more spring tips, and the micromirror. The first spacer material, the second spacer material, and the third spacer material are sacrificial layers that are removed to release the components of the MEMS device. The spacer materials may be removed using one or more dry or wet etching steps in one example. In one example, a liquid solution dissolves the spacer materials, leaving the remaining structures in place. The resulting structure may be similar to the structure shown in FIG. 4G in one example.

In examples herein, the contact edges between two surfaces in a MEMS device are manufactured to be sharp edges, with a small ROC. These sharp edges reduce the size of the contact area between two surfaces or two edges. Reduced contact area produces less stiction between the two contacting surfaces or edges. Reducing the contact area between two surfaces or edges is useful for reducing stiction in any type of MEMS device. The examples herein are particularly useful in MEMS actuators, where a component of the MEMS device is configured to move mechanically and contact at least one other surface or edge. In one example, stiction may occur between the mirror and the spring tip and cause failure of the device. A recessed mirror shelf on the underside of the mirror may be fabricated as described above to rest on the spring tip. The recessed mirror shelf may have a sharp edge with a small ROC that reduces the size of the contact area between the mirror and the spring tip. In some examples, the spring tip may have a sharp edge with a small ROC as well. The smaller contact area reduces stiction between the mirror and the spring tip. In another example, an edge of the mirror is fabricated to have a retrograde edge. The retrograde edge reduces the size of the contact area between the mirror and the spring tip.

In another example, a mirror may be created with a notch, where the mirror contacts the spring tip at an edge of the notch. This example also reduces the size of the contact area between the mirror and the spring tip. In another example, the mirror is reduced in size so the edge of the mirror contacts the spring tip, rather than the underside of the micromirror. In another example, an extension to the spring tip may be manufactured so the edge of the mirror contacts the extension, rather than the underside of the mirror contacting the un-extended spring tip.

DMDs are described as one example herein. However, the techniques described herein may be applied to any MEMS device where stiction between two surfaces is overcome. Other types of MEMS devices where examples herein are useful include variable capacitors, where MEMS switches operate to switch between different capacitors. MEMS devices that include levers, cantilevers, gears, hinges, or other mechanical components may be manufactured using the techniques described herein to reduce stiction. Other MEMS devices where stiction may be reduced using the examples described herein include scratch drive actuators, inchworm motors, electrostatic relays, thermal actuators, and magnetic actuators.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means +/−10 percent of the stated value. Modifications are possible in the described examples, and other examples are possible within the scope of the claims.

What is claimed is:

1. A system, comprising:
    a first edge of a first surface of a microelectromechanical systems (MEMS) device, wherein the first edge is an etched edge; and
    a second surface and second edge of a MEMS device, wherein the second edge is an etched edge, wherein the first edge is configured to move and contact the second edge, and wherein the first surface is non-parallel to the second surface.

2. The system of claim 1, wherein the MEMS device is a digital micromirror device (DMD), and the first edge is an edge of a micromirror.

3. The system of claim 2, wherein the edge of the micromirror includes a notch, and the notch is configured to contact a spring tip of the DMD responsive to a tilt of the micromirror.

4. The system of claim 1, wherein the MEMS device is a DMD, and the second surface is a spring tip.

5. The system of claim 4, wherein the spring tip extends into a mirror gap between a first micromirror and a second micromirror.

6. The system of claim 1, wherein the MEMS device is a DMD, and the first edge is a retrograde edge of a micromirror.

7. The system of claim 6, wherein the retrograde edge is configured to contact a spring tip of the DMD responsive to a tilt of the micromirror.

8. A method, comprising:
    depositing a first metal layer for a hinge and one or more spring tips on a first spacer material;
    depositing a second spacer material on the first metal layer;
    patterning a mirror via in the second spacer material;
    depositing a second metal layer for a recessed mirror shelf on the second spacer material;
    patterning the second metal layer to create the recessed mirror shelf;
    depositing a third spacer material on the second metal layer;
    etching the third spacer material;

depositing a third metal layer on the third spacer material and the second metal layer to create a top surface of a micromirror; and removing the first spacer material, the second spacer material, and the third spacer material to release the recessed mirror shelf, the hinge, the one or more spring tips, and the micromirror.

9. The method of claim 8, wherein the third metal layer comprises an aluminum alloy.

10. The method of claim 8, wherein the first spacer material, the second spacer material, and the third spacer material comprise photoresist.

11. The method of claim 8, wherein an edge of the top surface of the micromirror extends beyond an edge of the recessed mirror shelf.

12. The method of claim 8, wherein the recessed mirror shelf is configured to contact at least one of the one or more spring tips responsive to the hinge tilting the micromirror.

13. The method of claim 12, wherein the recessed mirror shelf includes an edge that contacts at least one spring tip, and the edge has a radius of curvature (ROC) of less than 50 nanometers.

14. The method of claim 13, wherein the at least one spring tip contacts the recessed mirror shelf at an edge that has an ROC of less than 50 nanometers.

15. A system, comprising:
a digital micromirror device (DMD), comprising:
 a hinge and one or more spring tips coupled to the hinge, wherein the hinge is configured to tilt toward a raised address electrode; and
 a micromirror comprising a recessed mirror shelf and a reflective surface, wherein the recessed mirror shelf is coupled to the hinge, and wherein the recessed mirror shelf is configured to contact at least one of the one or more spring tips responsive to the hinge tilting toward the raised address electrode.

16. The system of claim 15, wherein the recessed mirror shelf contacts the one or more spring tips with an edge having a radius of curvature (ROC) of less than 50 nanometers.

17. The system of claim 15, wherein the recessed mirror shelf contacts the one or more spring tips with an edge having an ROC of less than 10 nanometers.

18. The system of claim 15, wherein the recessed mirror shelf comprises an aluminum alloy, an oxide, or a nitride.

19. The system of claim 15, wherein the reflective surface of the micromirror extends beyond an edge of the recessed mirror shelf.

20. The system of claim 15, wherein an edge of the one or more spring tips that contacts the recessed mirror shelf has an ROC of less than 50 nanometers.

* * * * *